(12) United States Patent
Gyorfi et al.

(10) Patent No.: US 8,350,871 B2
(45) Date of Patent: *Jan. 8, 2013

(54) METHOD AND APPARATUS FOR CREATING VIRTUAL GRAFFITI IN A MOBILE VIRTUAL AND AUGMENTED REALITY SYSTEM

(75) Inventors: Julius S. Gyorfi, Vernon Hills, IL (US); Eric R. Buhrke, Clarendon Hills, IL (US); Juan M. Lopez, Chicago, IL (US); Han Yu, Carpentersville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 681 days.

This patent is subject to a terminal disclaimer.

(21) Appl. No.: 12/365,266

(22) Filed: Feb. 4, 2009

(65) Prior Publication Data
US 2010/0194782 A1    Aug. 5, 2010

(51) Int. Cl.
*G09G 5/02* (2006.01)
(52) U.S. Cl. ........................................ 345/633
(58) Field of Classification Search .................... 345/633
See application file for complete search history.

(56) References Cited

U.S. PATENT DOCUMENTS

| | | | |
|---|---|---|---|
| 5,799,098 A * | 8/1998 | Ort et al. | 382/125 |
| 6,222,939 B1 * | 4/2001 | Wiskott et al. | 382/209 |
| 6,304,898 B1 * | 10/2001 | Shiigi | 709/206 |
| 6,317,127 B1 | 11/2001 | Daily et al. | |
| 6,377,793 B1 | 4/2002 | Jenkins | |
| 6,625,456 B1 | 9/2003 | Busso et al. | |
| 6,681,107 B2 | 1/2004 | Jenkins et al. | |
| 6,879,835 B2 | 4/2005 | Greene et al. | |
| 6,917,107 B2 | 7/2005 | Akram | |
| 6,917,370 B2 | 7/2005 | Benton | |
| 7,003,308 B1 * | 2/2006 | Fuoss et al. | 455/466 |
| 7,027,622 B2 * | 4/2006 | Pengwu | 382/118 |

(Continued)

FOREIGN PATENT DOCUMENTS

JP     2003-303356 A     10/2003

(Continued)

OTHER PUBLICATIONS

Patent Cooperation Treaty, International Search Report and Written Opinion of the International Searching Authority for International Application No. PCT/US2010/022091, Sep. 3, 2010, 8 pages.

(Continued)

*Primary Examiner* — Javid A Amini
(74) *Attorney, Agent, or Firm* — Stephen H. Shaw; Kenneth Haas

(57) ABSTRACT

A method and apparatus is provided for easily creating virtual graffiti that will be left for a particular device to view. During operation a device will be placed near a first point that is used to define a boundary for the virtual graffiti. The device will locate the first point, and use the point to define the boundary. The device will receive an image that is to be used as virtual graffiti, and will fit the image within the boundary of the virtual graffiti. For example, the device may be consecutively placed near four points that will define a polygon to be used as the boundary for the virtual graffiti. An image will then be received, and the image will be fit within the polygon.

11 Claims, 8 Drawing Sheets

201

Real-world door

201

Real-world door having
Virtual graffiti upon it

201

Real-world door having
Virtual graffiti upon it

U.S. PATENT DOCUMENTS

| | | | |
|---|---|---|---|
| 7,042,421 | B2 | 5/2006 | Hobgood et al. |
| 7,050,078 | B2 | 5/2006 | Dempski |
| 7,065,253 | B2 * | 6/2006 | Acharya et al. ............... 382/240 |
| 7,113,618 | B2 | 9/2006 | Junkins et al. |
| 7,224,991 | B1 * | 5/2007 | Fuoss et al. .................... 455/466 |
| 7,395,507 | B2 | 7/2008 | Robarts et al. |
| 7,844,229 | B2 * | 11/2010 | Gyorfi et al. ...................... 455/70 |
| 7,853,296 | B2 * | 12/2010 | Yu et al. ......................... 455/566 |
| 8,019,167 | B2 * | 9/2011 | Dvir et al. ...................... 382/232 |
| 2002/0102996 | A1 | 8/2002 | Jenkins |
| 2002/0144007 | A1 | 10/2002 | Shteyn |
| 2002/0163518 | A1 * | 11/2002 | Rising et al. ................... 345/440 |
| 2002/0177435 | A1 | 11/2002 | Jenkins et al. |
| 2003/0104820 | A1 | 6/2003 | Greene et al. |
| 2003/0108247 | A1 * | 6/2003 | Acharya et al. ............... 382/240 |
| 2003/0190060 | A1 * | 10/2003 | Pengwu ........................ 382/118 |
| 2004/0137882 | A1 | 7/2004 | Forsyth |
| 2004/0203903 | A1 | 10/2004 | Wilson et al. |
| 2004/0214550 | A1 | 10/2004 | Jenkins |
| 2005/0099400 | A1 | 5/2005 | Lee |
| 2005/0131776 | A1 | 6/2005 | Perotti et al. |
| 2005/0147292 | A1 * | 7/2005 | Huang et al. ................... 382/159 |
| 2005/0289590 | A1 | 12/2005 | Cheok et al. |
| 2006/0085419 | A1 | 4/2006 | Rosen |
| 2006/0103665 | A1 * | 5/2006 | Opala et al. .................... 345/619 |
| 2006/0179127 | A1 | 8/2006 | Randall |
| 2006/0241859 | A1 | 10/2006 | Kimchi et al. |
| 2006/0277474 | A1 | 12/2006 | Robarts et al. |
| 2007/0024527 | A1 | 2/2007 | Heikkinen et al. |
| 2007/0032244 | A1 | 2/2007 | Counts et al. |
| 2007/0043828 | A1 | 2/2007 | Famolari et al. |
| 2007/0044010 | A1 * | 2/2007 | Sull et al. .................... 715/500.1 |
| 2007/0153731 | A1 * | 7/2007 | Fine ............... 370/329 |
| 2008/0079751 | A1 | 4/2008 | Arrascuori |
| 2008/0122871 | A1 * | 5/2008 | Guday ........................ 345/634 |
| 2008/0154697 | A1 | 6/2008 | Guday et al. |
| 2008/0159639 | A1 * | 7/2008 | Dvir et al. ...................... 382/236 |
| 2008/0215994 | A1 | 9/2008 | Harrison et al. |
| 2008/0225779 | A1 | 9/2008 | Bragiel et al. |
| 2009/0054084 | A1 | 2/2009 | Buhrke et al. |
| 2009/0081959 | A1 | 3/2009 | Gyorfi et al. |
| 2009/0111434 | A1 * | 4/2009 | Yu et al. ..................... 455/414.1 |
| 2009/0237328 | A1 * | 9/2009 | Gyorfi et al. ...................... 345/9 |
| 2009/0327240 | A1 * | 12/2009 | Meehan et al. .................... 707/3 |
| 2010/0066750 | A1 * | 3/2010 | Yu et al. ......................... 345/581 |
| 2010/0194782 | A1 * | 8/2010 | Gyorfi et al. ................... 345/633 |
| 2010/0214111 | A1 * | 8/2010 | Schuler et al. ............. 340/686.1 |
| 2011/0153776 | A1 * | 6/2011 | Opala et al. .................... 709/217 |

FOREIGN PATENT DOCUMENTS

| | | |
|---|---|---|
| JP | 2006-313549 A | 11/2006 |
| KR | 2002-0043589 A | 6/2002 |
| KR | 10-2005-0055506 A | 6/2005 |
| KR | 10-2005-0078136 A | 8/2005 |
| KR | 10-2006-0057150 A | 5/2006 |
| KR | 100754745 B1 | 8/2007 |
| KR | 10-2008-0022983 A | 3/2008 |
| WO | 2008041101 A2 | 4/2008 |

OTHER PUBLICATIONS

Patent Cooperation Treaty, "PCT Search Report and Written Opinion of the International Searching Authority" for International Application No. PCT/US2008/082549 May 28, 2009, 11 pages.

United States Patent and Trademark Office, "Non-Final Rejection" for U.S. Appl. No. 11/962,139 dated Dec. 13, 2010, 15 pages.

Ross Mayfield, "Augmented Moblogging," Ross Mayfield's Weblog: Markets, Technology and Musings, http:/radio.weblogs.com, Jan. 28, 2003 pp. 1-6.

Olga Kharif, "Social Networking Goes Mobile," Business Week Online, www.businessweek.com, May 31, 2006, pp. 1-2.

Patent Cooperation Treaty, "PCT Search Report and Written Opinion of the International Searching Authority" for International Application No. PCT/US2008/074600 Mar. 24, 2009, 12 pages.

Patent Cooperation Treaty, "PCT Search Report and Written Opinion of the International Searching Authority" for International Application No. PCT/US2008/078255 Apr. 16, 2009, 13 pages.

United States Patent and Trademark Office, "Non-Final Rejection" for U.S. Appl. No. 11/930,974 dated Aug. 25, 2010, 16 pages.

Lim, et al., "MY Virtual Graffiti System," IEEE International Conference on Multimedia and Expo, pp. 847-850, 2004.

Hughes, "Experimental Wireless Art Project Enables Virtual Graffiti," University of Georgia Research, http://tagging.us/html/pr.html, downloaded Mar. 14, 2008.

Singh, et al., "Augmented Reality Post-It System," ACM SIGCHI International Conference on Advances in Computer Entertainment Technology, 2004.

Garner, et al., "The Mobile Phone as Digital SprayCan," ACM SIGCHI International Conference on Advances in Computer Entertainment Technology, 2006.

Simon, et al., "Towards Orientation-Aware Location Based Mobile Services," Third Symposium on LBS and Telecartgraphy, Vienna, Austria, Nov. 28-30, 2005.

Jonietz, "TR10: Augmented Reality; Markus Kahari Wants to Superimpose Digital Information on the Real World," MIT Technology Review, Mar. 12, 2007.

Nokia, "Nokia Research Project: MARA," http://research.nokia.com/research/projects/mara/index.html, downloaded Mar. 14, 2008.

Rekimoto, et al., "Augment-able Reality: Situated Communication through Digital and Physical Spaces," IEEE 2nd International Symposium on Wearable Computers, pp. 68-75, 1998.

Rekimoto, "TRANSVISION: A Hand-Held Augmented Reality System for Collaborative Design," International Conference on Virtual Systems and Multimedia, pp. 85-90, 1996.

Patent Cooperation Treaty, "PCT Search Report and Written Opinion of the International Searching Authority" for International Application No. PCT/US2009/037257 Oct. 29, 2009, 11 pages.

United States Patent and Trademark Office, "Non-Final Rejection" for U.S. Appl. No. 12/051,969 dated Feb. 14, 2011, 15 pages.

European Patent Office, "Extended European Search Report" for European Patent Application No. 09723170.8-2211 Apr. 4, 2012, 6 pages.

Korean Intellectual Property Office, Preliminary Rejection for Korean Patent Application No. 10-2010-0723341 dated May 3, 2012, 3 pages.

D. Lopez-de-lpina et al., "A Context-Aware Mobile Mash-up Platform for Ubiquitous Web," Intelligent Environments, 2007, IE 07, 3rd IET International Conference, Sep. 2007, pp. 116-123.

Patent Cooperation Treaty, "PCT Search Report and Written Opinion of the International Searching Authority" for International Application No. PCT/US2008/073122 Feb. 9, 2009, 12 pages.

United States Patent and Trademark Office, "Non-Final Rejection" for U.S. Appl. No. 11/962,139 dated Aug. 29, 2012, 9 pages.

* cited by examiner

100

Real-world door having
Virtual graffiti upon it

Real-world door having
Virtual graffiti upon it

Real-world door

101

105, 107, 109

US 8,350,871 B2

METHOD AND APPARATUS FOR CREATING VIRTUAL GRAFFITI IN A MOBILE VIRTUAL AND AUGMENTED REALITY SYSTEM

FIELD OF THE INVENTION

The present invention relates virtual and augmented reality systems, and in particular, to a method and apparatus for creating virtual graffiti in a mobile virtual and augmented reality system.

BACKGROUND OF THE INVENTION

Messaging systems have been used for years to let users send and receive messages to each other. Currently, one of the simplest ways to send a message to another individual is to simply send a text message to the individual's cellular phone. Recently, it has been proposed to expand the capabilities of messaging systems so that subscribers of the network may be given the option of leaving a specific message at a particular coordinate location. For example, in U.S. Pat. No. 6,681,107B2, SYSTEM AND METHOD OF ACCESSING AND RECORDING MESSAGES AT COORDINATE WAY POINTS, the author proposes that a subscriber can merely push a button at a specific location causing the Device to save the physical location. Then he can push a "record message" button which allows him to speak a message into his device. This message could be directions to the subscriber's house from the specific location or any other personal message. The message is then uploaded to the network where it will become available to other network subscribers. The person creating the message can designate whether the message is available to all subscribers, only the persons stored in the memory of the Subscriber's Device, a subset of the persons stored in memory, or even a single person.

In order to enhance the user's experience with the above-type of context-aware messaging system, the types of information provided to the users must go beyond simple text, images, and video. With this in mind, U.S. patent application Ser. No. 11/844,538, MOBILE VIRTUAL AND AUGMENTED REALITY SYSTEM, by Buhrke et al. proposes a system that leaves virtual graffiti for individuals. During operation a user can create "virtual graffiti" that will be left for a particular device to view as part of an augmented reality scene.

While the system of Buhrke does enhance a user's experience, a need exists for a method and apparatus for easily creating the virtual graffiti that will be left for a particular device to view.

Figure 1:
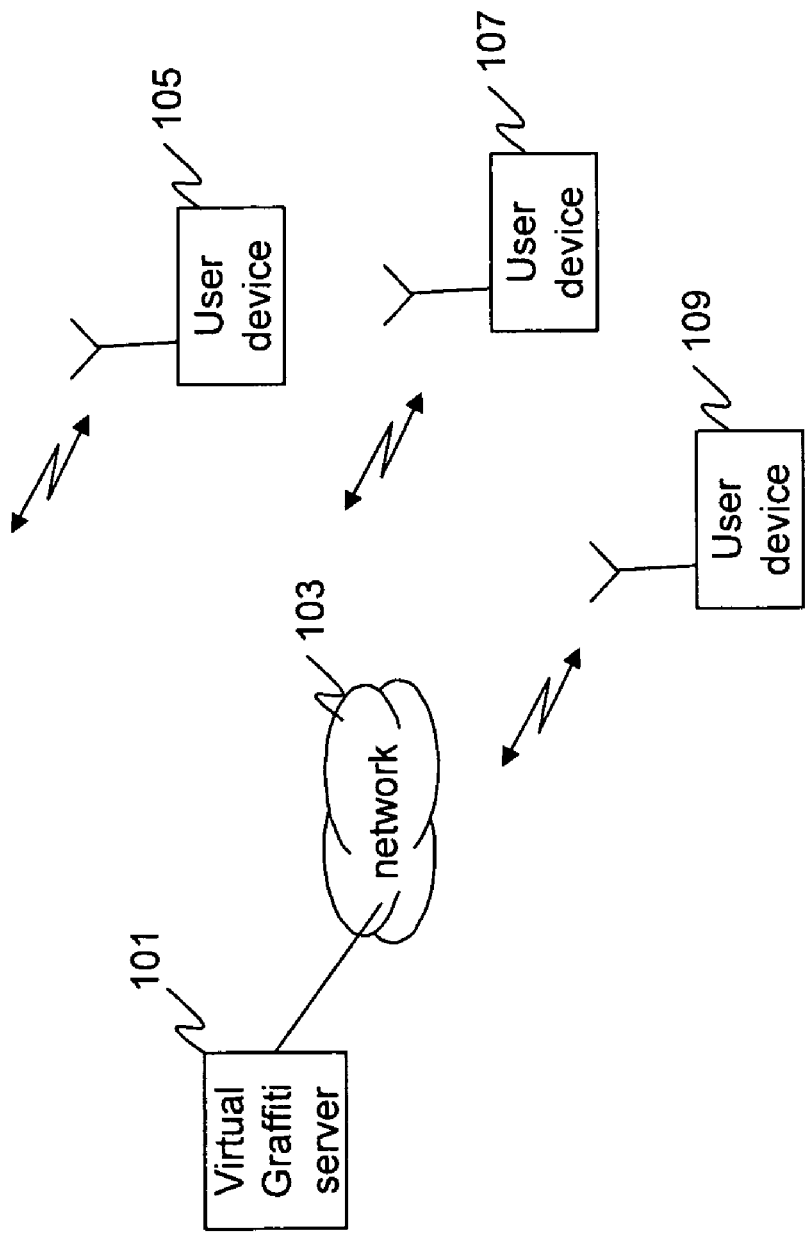
FIG. 1 is a block diagram of a context-aware messaging system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to address the above-mentioned need, a method and apparatus is provided for easily creating virtual graffiti that will be left for a particular device to view. During operation a device will be placed near a first point that is used to define a boundary for the virtual graffiti. The device will locate the first point, and use the point to define the boundary. The device will receive an image that is to be used as virtual graffiti, and will fit the image within the boundary of the virtual graffiti. For example, the device may be consecutively placed near four points that will define a polygon to be used as the boundary for the virtual graffiti. An image will then be received, and the image will be fit within the polygon.

The above-described method for creating virtual graffiti can be used to easily create virtual graffiti of various sizes and shapes. For example, a user may wish to place a virtual bull's eye around a large area so that it can be easily seen from passing airplanes. With the above technique, the user can simply walk to the edges of the desired boundary and instruct the device to use the locations as a boundary of the virtual graffiti.

In an augmented reality system, computer generated images, or "virtual images" may be embedded in or merged with the user's view of the real-world environment to enhance the user's interactions with, or perception of the environment. In the present invention, the user's augmented reality system merges any virtual graffiti messages with the user's view of the real world.

As an example, a first user may wish to leave a message for a second user to try a particular menu item at a restaurant. The message may be virtually written on the door of the restaurant, and left for the second user to view. When the second user visits the restaurant, he will receive an indication that virtual graffiti is available for him to view. The message will then appear to the second user on the door of the restaurant when viewed with the second user's augmented reality system. In a similar manner, the user may wish to leave a message for himself.

The present invention encompasses a method for a device to create virtual graffiti, the method comprises the steps of being placing near a first point, determining a location of the first point, using the location of the first point to define a boundary for the virtual graffiti, receiving an image to be used as the virtual graffiti, and providing the image and information on the boundary to a server. The server then provides the virtual graffiti to a user when that user is near a location of the virtual graffiti.

The present invention additionally encompasses a method for a device to create virtual graffiti. The method comprises the steps of being placing near a first point, determining a location of the first point, being placed near a second point, and determining a location of the second point. A boundary for the virtual graffiti is determined by using at least the location of the first point and the location of the second point as vertices for the boundary for the virtual graffiti. An image is then received to be used as virtual graffiti and the virtual graffiti is created by fitting the image within the boundary of the virtual graffiti.

The present invention additionally encompasses an apparatus comprising location circuitry, logic circuitry accessing the location circuitry to determine a location of a point used to define a boundary for virtual graffiti, the logic circuitry then receiving an image to be used as virtual graffiti, and a transmitter providing the image and information on the boundary to a server, wherein the server provides the virtual graffiti to a user when that user is near a location of the virtual graffiti.

The present invention additionally encompasses an apparatus comprising location circuitry being placing near a first point and a second point and determining a location of the first point and a location of the second point. The apparatus additionally comprising logic circuitry receiving an image to be used as virtual graffiti and determining a boundary for the virtual graffiti by using at least the location of the first point and the location of the second point as vertices for the boundary for the virtual graffiti, the logic circuitry creating the virtual graffiti by fitting the image within the boundary for the virtual graffiti.

Turning now to the drawings, wherein like numerals designate like components, FIG. 1 is a block diagram of context-aware messaging system 100. System 100 comprises virtual graffiti server 101, network 103, and user devices 105-109. In one embodiment of the present invention, network 103 comprises a next-generation cellular network, capable of high data rates. Such systems include the enhanced Evolved Universal Terrestrial Radio Access (UTRA) or the Evolved Universal Terrestrial Radio Access Network (UTRAN) (also known as EUTRA and EUTRAN) within 3GPP, along with evolutions of communication systems within other technical specification generating organizations (such as 'Phase 2' within 3GPP2, and evolutions of IEEE 802.11, 802.16, 802.20, and 802.22). User devices 105-109 comprise devices capable of real-world imaging and providing the user with the real-world image augmented with virtual graffiti.

During operation, a user (e.g., a user operating user device 105) determines that he wishes to send another user virtual graffiti as part of an augmented reality scene. User device 105 is then utilized to create the virtual graffiti and associate the virtual graffiti with a location. The user also provides device 105 with a list of user(s) (e.g., user 107) that will be allowed to view the virtual graffiti. Device 105 then utilizes network 103 to provide this information to virtual graffiti server 101.

Server 101 periodically monitors the locations of all devices 105-109 along with their identities, and when a particular device is near a location where it is to be provided with virtual graffiti, server 101 utilizes network 103 to provide this information to the device. When a particular device is near a location where virtual graffiti is available for viewing, the device will notify the user, for example, by beeping. The user can then use the device to view the virtual graffiti as part of an augmented reality scene. Particularly, the virtual graffiti will be embedded in or merged with the user's view of the real-world. It should be noted that in alternate embodiments, no notification is sent to the user. It would then be up to the user to find any virtual graffiti in his environment.

Figure 2:
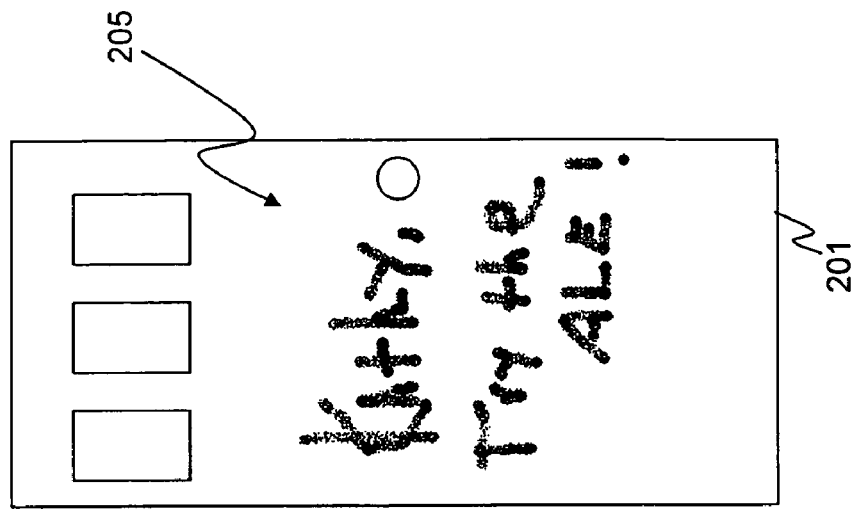
FIG. 2 illustrates an augmented reality scene.
Figure 2:
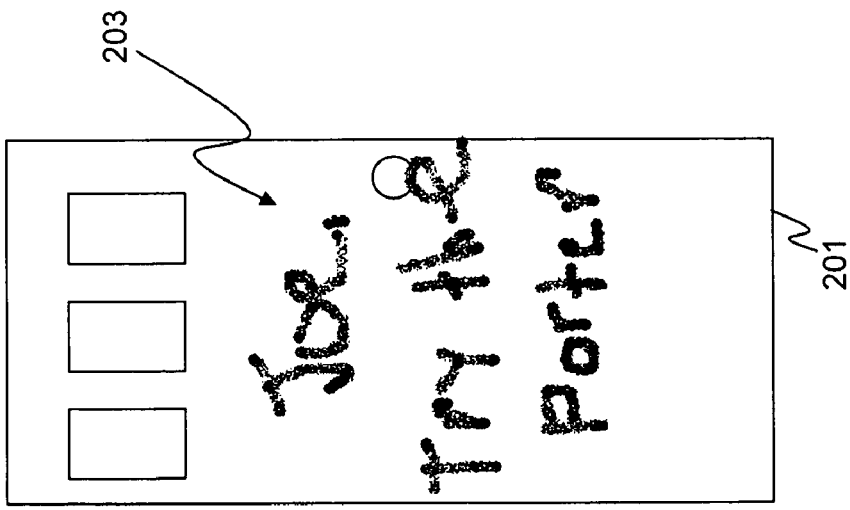
Figure 2:
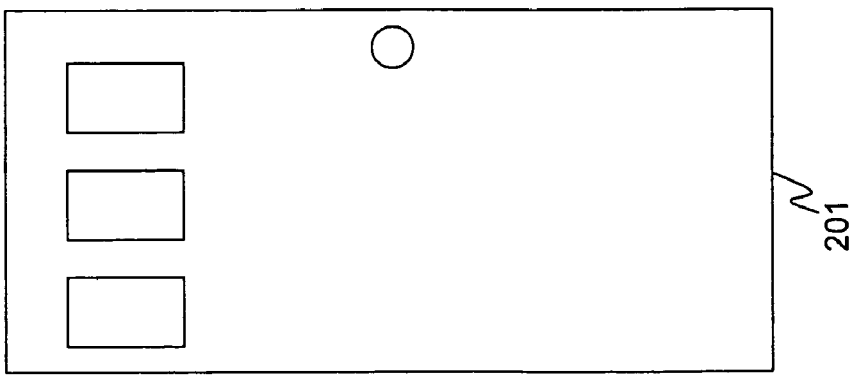

FIG. 2 illustrates an augmented reality scene. In this example, a user has created virtual graffiti 203 that states, "Joe, try the porter" and has attached this virtual graffiti to the location of the door. As is shown in FIG. 2, the real-world door 201 does not have the virtual graffiti existing upon it. However, if a user has privileges to view the virtual graffiti, then their augmented reality viewing system will show door 201 having virtual graffiti 203 upon it. Thus, as is obvious, the virtual graffiti is not available to all users of system 100. The virtual graffiti is only available to those designated able to view it (preferably by the individual who created the virtual graffiti). Thus, each device 105-109 will provide a unique augmented reality scene to their user. For example, a first user may view a first augmented reality scene, while a second user may view a totally different augmented reality scene. This is illustrated in FIG. 2 with virtual graffiti 205 being different than virtual graffiti 203. Thus, a first user, looking at door 201 may view virtual graffiti 203, while a second user, looking at the same door 201 may view virtual graffiti 205.

Although the above example was given with virtual graffiti 203 displayed on a particular object (i.e., door 201), in alternate embodiments of the present invention, virtual graffiti may be displayed not attached to any object. For example, virtual graffiti may be displayed as floating in the air, or simply in front of a person's field of view. As is evident, for any particular device 105-109 to be able to display virtual graffiti attached to a particular object, a device must be capable of identifying the object's location, and then displaying the virtual graffiti at the object's location.

Given a virtual scene containing virtual graffiti (at the specified virtual coordinates) and a viewpoint, a 3-dimensional rendering system such as the Java Mobile 3D Graphics, or M3G, API can produce a view of the virtual scene unique to the user. This virtual scene must be overlaid onto a view of the real world to produce an augmented reality scene. One method to overlay the virtual scene onto a view of the real world from the mobile device's camera is to make use of the M3G background object which allows any image to be placed behind the virtual scene as its background. Using the M3G background, continuously updated frames from the camera can be placed behind the virtual scene, thus making the scene appear to be overlaid on the camera output.

Given the above information, when a user views virtual graffiti, the device's location is determined and sent to the server. The server determines what messages, if any, are in proximity to and available for the user. These messages are then downloaded by the user and processed. The processing involves transforming the physical locations of the virtual messages into virtual coordinates. The messages are then placed at those virtual coordinates. At the same time, the device's position and its orientation are used to define a viewpoint into the virtual world also in virtual coordinates. If the downloaded virtual message is visible from the given viewpoint, it is rendered on a mobile device's display on top of live video of the scene from the device's camera.

Thus, if the user wants to place a virtual message on the top of an object, the user must identify the location of the point on top of the object where the message will be left. In the simplest case, the user can place his device on the object and capture the location. He then sends this location with the virtual object and its associated content (i.e., a beer stein with the text message "try the porter" applied to the southward-facing side of the stein) to the server. The user further specifies that the message be available for a particular user. When the particular user arrives at the bar and is within range of the message, he will see the message from his location (and, therefore, his viewpoint). If he is looking toward the eastward-facing side of the message, he will see the stein, but will just be able to tell that there is some text message on the southern side. If a user wishes to read the text message, he will have to move his device (and thus his viewpoint) so that it is facing the southern side of the stein.

Figure 3:
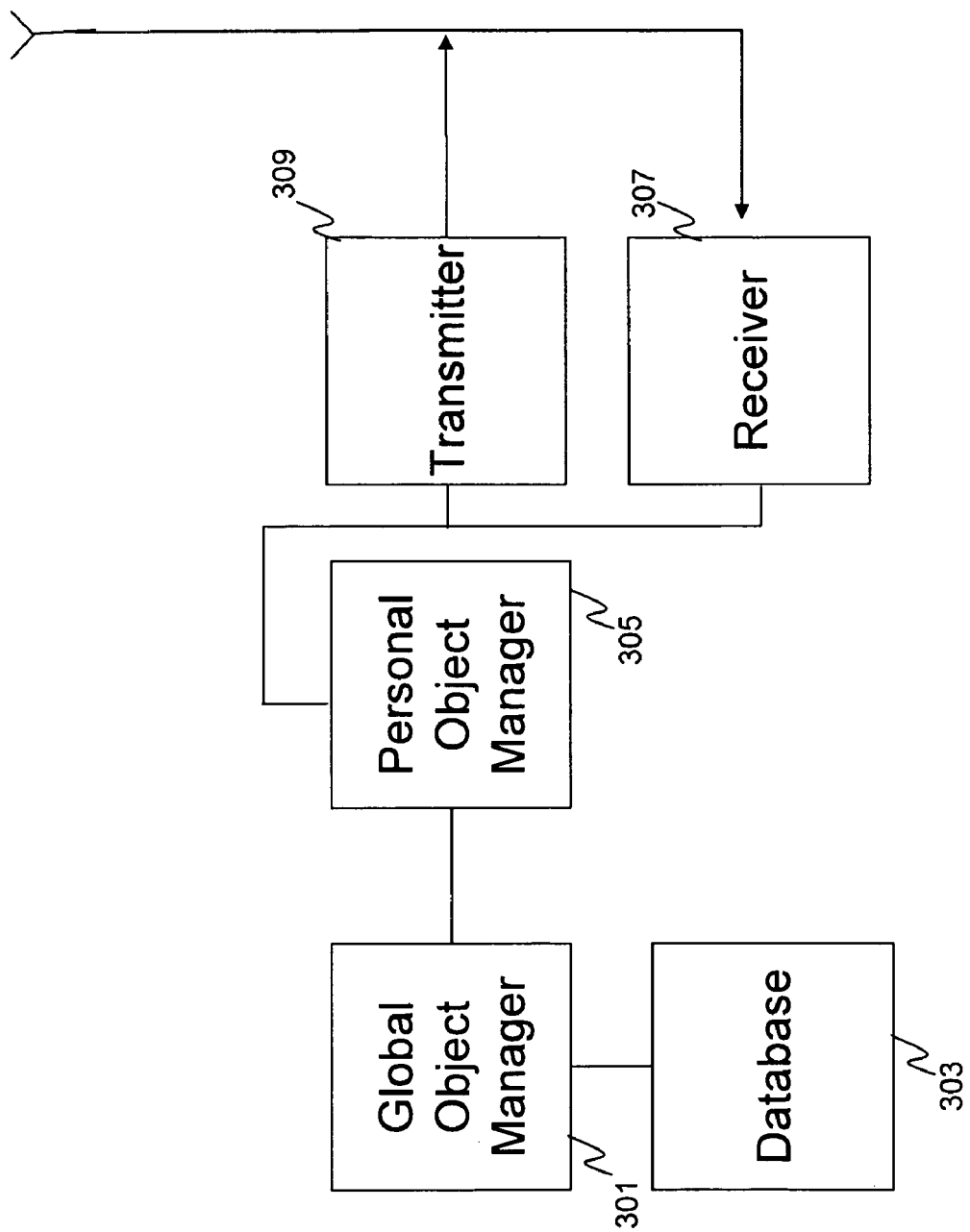
FIG. 3 is a block diagram of the server of FIG. 1.

FIG. 3 is a block diagram of the server of FIG. 1. As is evident, server 101 comprises a global object manager 301, database 303, and personal object manager 305. During operation, global object manager 301 will receive virtual graffiti from any device 105-109 wishing to store virtual graffiti on server 101. This information is preferably received wirelessly through receiver 307. Global object manager 301 is responsible for storing all virtual graffiti existing within system 100. Along with the virtual graffiti, global object manager 301 will also receive a location for the virtual graffiti along with a list of devices that are allowed to display the virtual graffiti. Again, this information is preferably received wirelessly through receiver 307. If the virtual graffiti is to be attached to a particular item, then the information needed for attaching the virtual graffiti to the object will be received as well. This information preferably comprises a location of a boundary for the virtual graffiti and the image that is to be displayed within the boundary. All of the above information is stored in database 303.

Although only one personal object manager 305 is shown in FIG. 3, it is envisioned that each subscriber will have its own personal object manager 305. Personal object manager 305 is intended to serve as an intermediary between its corresponding subscriber and global object manager 301. Personal object manager 305 will periodically receive a location for its corresponding subscriber's device. Once personal object manager 305 has determined the location of the device, personal object manager 305 will access global object manager 301 to determine if any virtual graffiti exists for the particular device at, or near the device's location. Personal object manager 305 filters all available virtual graffiti in order to determine only the virtual graffiti relevant to the particular device and the device's location. Personal object manager 305 then provides the device with the relevant information needed to display the virtual graffiti based on the location of the device, wherein the relevant virtual graffiti changes based on the identity and location of the device. This information preferably comprises a location of a boundary for the virtual graffiti and the image that is to be displayed within the boundary. This information will be provided to the device by instructing transmitter 309 to transmit the information wirelessly to the device.

Figure 4:
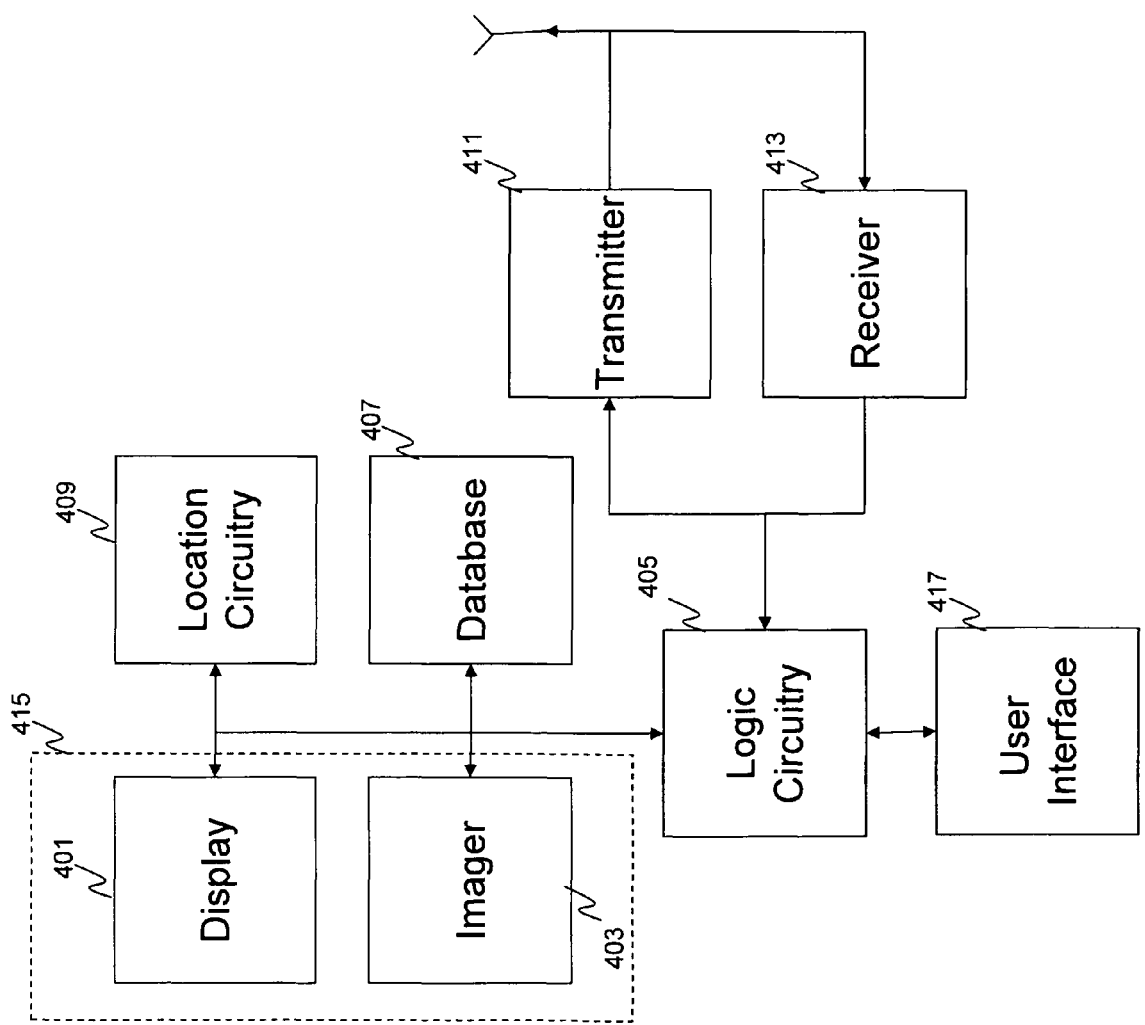
FIG. 4 is a block diagram of the user device of FIG. 1.

FIG. 4 is a block diagram of a user device of FIG. 1. As shown, the user device comprises augmented reality system 415, location circuitry 409, database 407, logic circuitry 405, transmitter 411, receiver 413, and user interface 417. During operation, a user of the device creates virtual graffiti via user interface 417. In one embodiment of the present invention, user interface 417 comprises an electronic tablet capable of receiving and creating handwritten messages and/or pictures. In another embodiment, pre-defined images are stored within database 407 and can be used in the creation of virtual graffiti. The process for creating virtual graffiti will be described in detail below.

Once logic circuitry 405 receives the virtual graffiti from user interface 417, logic circuitry 405 accesses location circuitry 409 and determines a location where the virtual graffiti was created. Logic circuitry 405 also receives a list of users with privileges to view the virtual graffiti. This list is also provided to logic circuitry 405 through user interface 417.

In one embodiment of the present invention the virtual graffiti is also associated with a physical object. When this is the case, logic circuitry 405 will also receive information required to attach the virtual graffiti to an object. In another embodiment logic circuitry 405 receives a location of a boundary for the virtual graffiti and the image that is to be displayed within the boundary. Finally, the virtual graffiti is provided to virtual graffiti server 101 by logic circuitry 405 instructing transmitter 411 to transmit the virtual graffiti, the location, the list of users able to view the virtual graffiti, and if relevant, the information needed to attach the virtual graffiti to an object.

As discussed above, server 101 periodically monitors the locations of all devices 105-109 along with their identities, and when a particular device is near a location where it is to be provided with virtual graffiti, server 101 utilizes network 103 to provide this information to the device.

When a particular device is near a location where virtual graffiti is available for viewing, the device will notify the user, for example, by instructing user interface 417 to beep. The user can then use the device to view the virtual graffiti as part of an augmented reality scene. Thus, when the device of FIG. 4 is near a location where virtual graffiti is available for it, receiver 413 will receive the virtual graffiti and the location of the virtual graffiti from server 101. If relevant, receiver 413 will also receive information needed to attach the virtual graffiti to a physical object. This information will be passed to logic circuitry 405 and stored in database 407.

Logic circuitry 405 periodically accesses location circuitry 409 to get updates to its location and provides these updates to server 101. When logic circuitry 405 determines that the virtual graffiti should be displayed, it will notify the user of the fact. The user can then use augmented reality system 415 to display the virtual graffiti. More particularly, imager 403 will image the current background and provide this to display 401. Display 401 will also receive the virtual graffiti from database 407 and provide an image of the current background with the virtual graffiti appropriately displayed. Thus, the virtual graffiti will be embedded in or merged with the user's view of the real-world.

Figure 5:
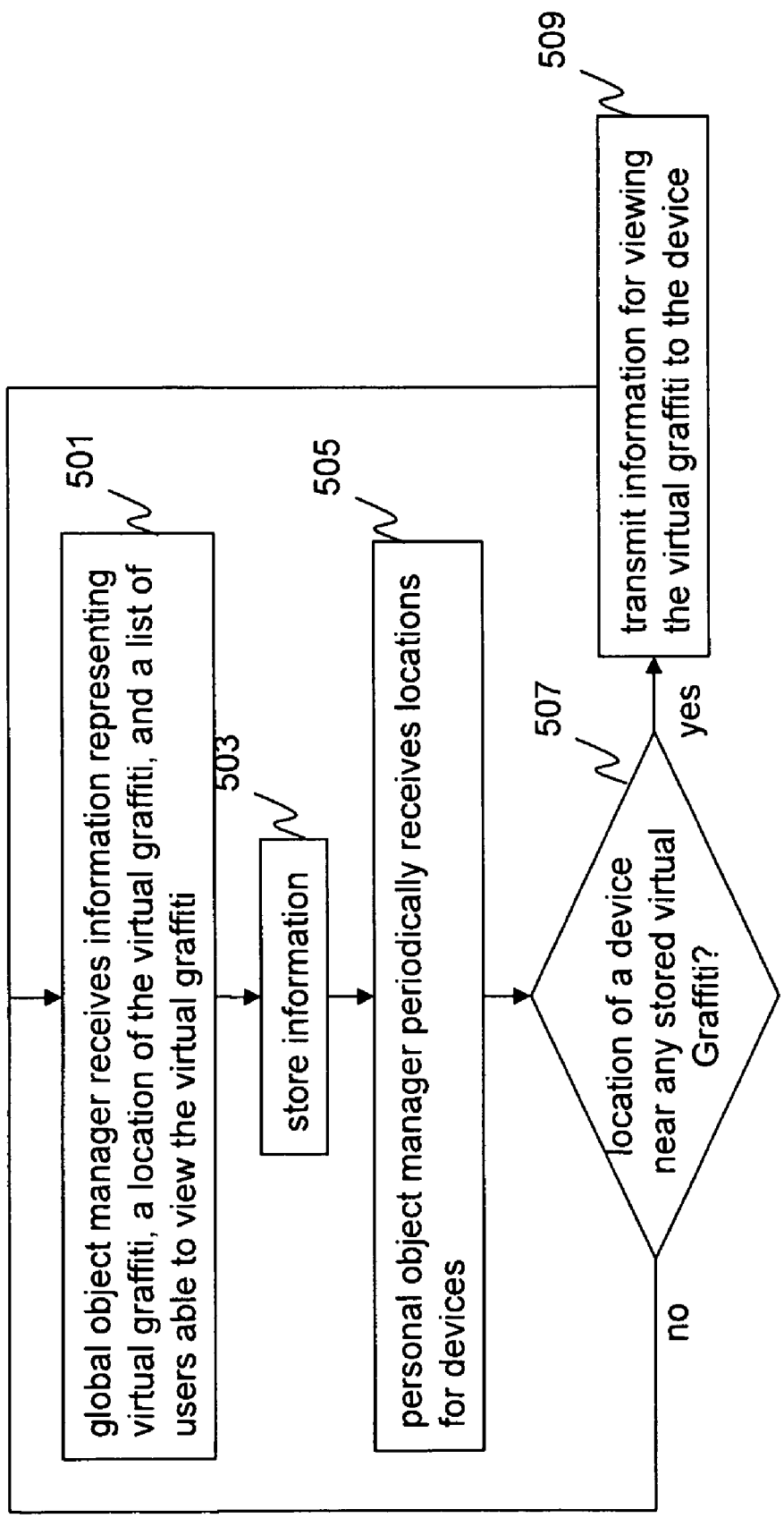
FIG. 5 is a flow chart showing operation of the server of FIG. 1.

FIG. 5 is a flow chart showing operation of the server of FIG. 1. The logic flow begins at step 501 where global object manager 301 receives from a first device, information representing virtual graffiti, a location of the virtual graffiti, and a list of users able to view the virtual graffiti. This information is then stored in database 303 (step 503). As discussed above, personal object manager 305 will periodically receive locations for devices (step 505) and determine if the location of a device is near any stored virtual graffiti (step 507). If, at step 507, personal object manager 305 determines that its corresponding device is near any virtual graffiti that it is able to view, then the logic flow continues to step 509 where the virtual graffiti and the necessary information for viewing the virtual graffiti is wirelessly transmitted to the device. However, if at step 507, it is determined that the device is not near any virtual graffiti, then the logic flow returns to step 501. As discussed above, the virtual graffiti is restricted as to what device can display the virtual graffiti.

Figure 8:
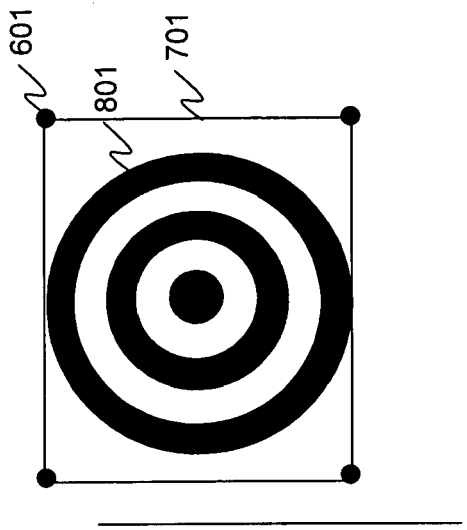
FIG. 8. illustrates the creation of virtual graffiti.
Figure 7:
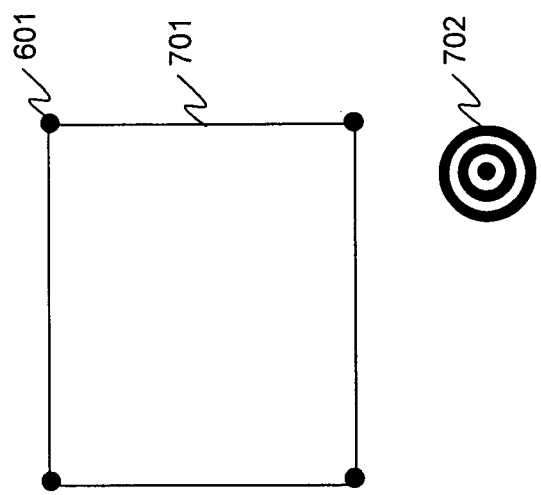
FIG. 7. illustrates the creation of virtual graffiti.
Figure 6:
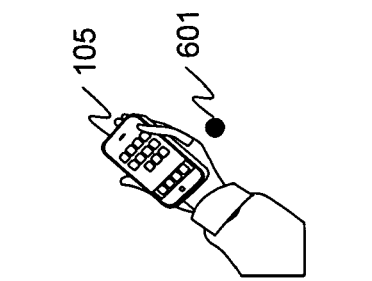
FIG. 6. illustrates the creation of virtual graffiti.

As discussed above, a need exists for a method and apparatus for easily creating the virtual graffiti that will be left for a particular device to view. With this in mind, during the creation of virtual graffiti, device 105 will be placed near a first point that is used to define a boundary for the virtual graffiti. The device will locate the first point, and use the point to define the boundary. The device will receive an image that is to be used as virtual graffiti, and will fit the image within the boundary of the virtual graffiti. For example, the device may be consecutively placed near multiple points that will define a polygon to be used as the boundary for the virtual graffiti. An image will then be received, and the image will be fit within the polygon. This process is illustrated in FIG. 6 through FIG. 8. In another example, the device may be placed near a single point that defines a center of a circle of a particular radius. The image will then be received and the image will be fit within the circle.

As shown in FIG. 6, device 105 is placed near vertex 601 of a geometrical shape. Device 105 is instructed by the user (via user interface 417) to use the particular location of device 105 as vertex 601. Logic circuitry 405 receives the instruction to capture vertex 601 and accesses location circuitry 409 to determine the location of the vertex. This process repeats until a boundary 701 is created from vertices 601.

Logic circuitry 405 additionally receives image 702 that will be used to create the virtual graffiti. Image 702 may be a hand-drawn image received from user interface 417, or alternatively may comprise a stored image from memory 407. Finally, as shown in FIG. 8, logic circuitry creates the virtual graffiti by appropriately fitting image 702 within boundary 701.

In an alternate embodiment, server 101 may create the virtual graffiti instead of device 105. In this scenario, boundary 701 and image 702 will be provided to server 101. Server 101 will create virtual graffiti 801, or may simply provide image 702 and boundary 701 to devices that are capable of viewing virtual graffiti 801. These devices will then create virtual graffiti 801 for viewing.

It should be noted that the above example was given with regards to device 105 creating vertices for defining a boundary for virtual graffiti. However, such a technique for creating virtual graffiti may not need device 105 to be placed over a vertex in order to identify boundary 701. For example, a predefined polygonal boundary of arbitrary size can be centered on the device's current location and oriented horizontally (parallel to the ground) or vertically (perpendicular to the group) as well as rotated by a specified amount (e.g., 10 degrees from due north). Another possibility is to define a subset of vertices by direct capture of coordinates from the device and to then enter a relative offset for the remaining coordinates. For example, the user could select a rectangular region of a wall of a building by capturing the lower two vertices of the rectangle with the device and then specifying an offset of 100 feet in the vertical direction above each coordinate.

Figure 9:
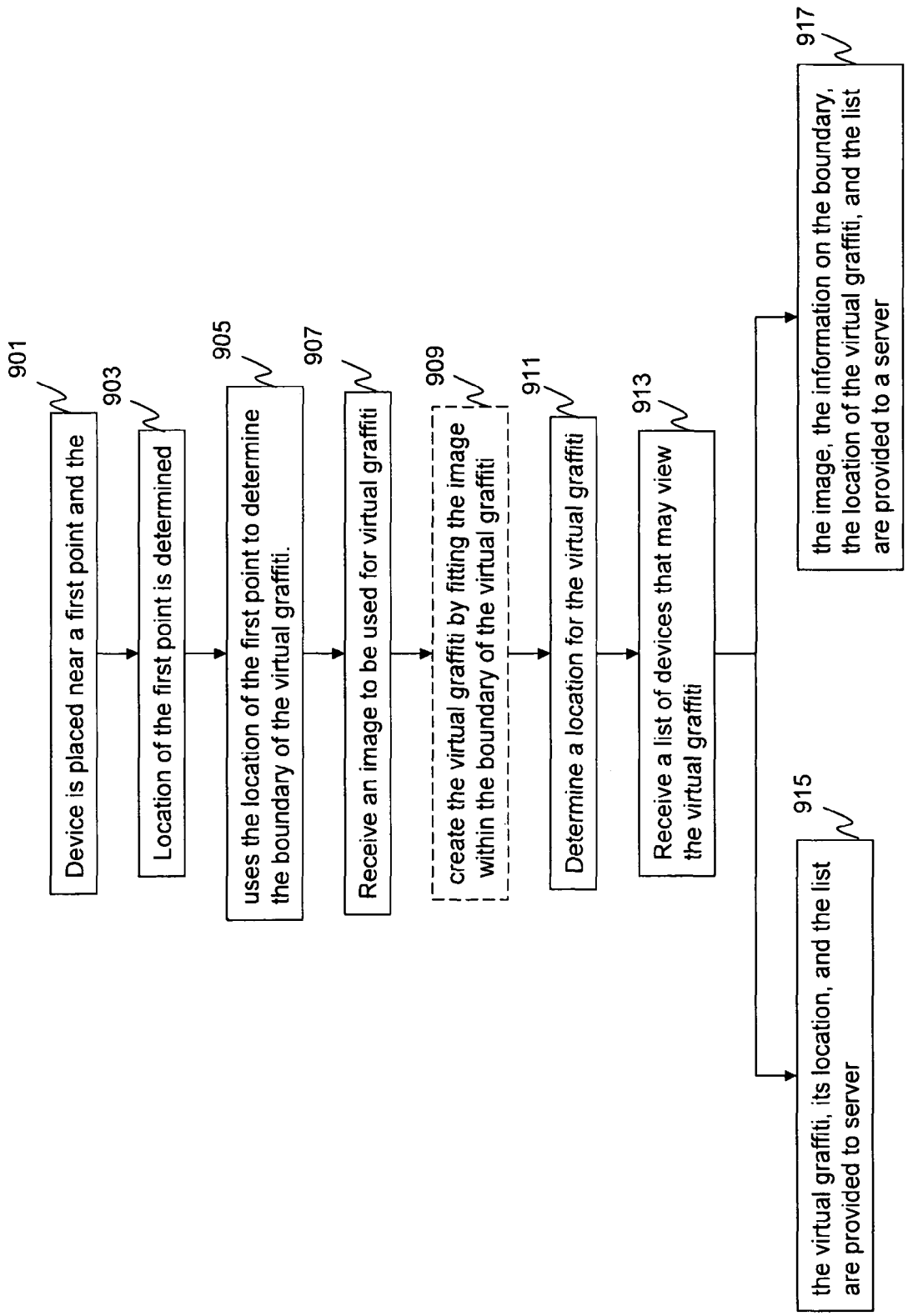
FIG. 9 is a flow chart showing operation of the user device of FIG. 1.

FIG. 9 is a flow chart showing operation of the user device of FIG. 1. In particular, the logic flow of FIG. 9 shows the steps necessary to create virtual graffiti and store the virtual graffiti on server 101 for others to view. The logic flow begins at step 901 where device 105 device is placed near a first point and a location of the first point is determined by logic circuitry 405 accessing location circuitry 409 (step 903). (It should be noted that steps 901 and 903 may repeat until a sufficient amount of locations are determined for points (i.e., at least a second point) defining the boundary for the virtual graffiti). At step 905 logic circuitry 409 uses at least the location of the first point (and possibly the location of other points) to determine the boundary of the virtual graffiti. As discussed above, the points may define vertices of the boundary, or alternatively, a single point may define an edge for a predetermined shape.

Continuing, at step 907 an image to be used in the creation of virtual graffiti is received by logic circuitry 409. As discussed above, the image may be received from database 407, or may be received from user input (interface) 417. The logic flow then continues to optional step 909. (Step 909 is executed whenever the virtual graffiti is to be created within device 105). At optional step 909 logic circuitry 409 creates the virtual graffiti by fitting the image within the boundary of the virtual graffiti.

Continuing, at step 911 logic circuitry 405 accesses location circuitry 409 to determine a location of the virtual graffiti and then receives a list of devices that may view the virtual graffiti (step 913). From this point in the logic flow, one of two paths may be taken. When the virtual graffiti is created by device 105, the logic flow continues to step 915 where the virtual graffiti, its location, and the list are provided to server 101, where the server provides the virtual graffiti to a user on the list when that user is near the location. This is accomplished by logic circuitry 405 utilizing transmitter 411 to wirelessly transmit the information.

When server 101 is creating the virtual graffiti, the logic flow continues to step 917 where the image, the information on the boundary, the location of the virtual graffiti, and the list are provided to a server 101, where the server creates the virtual graffiti and provides the virtual graffiti to a user when that user is near a location of the virtual graffiti.

It should be noted that while the above description was given with regards to using a two-dimensional image in creating virtual graffiti, in alternate embodiments, a 3 dimensional virtual object may be utilized in the creation of the virtual graffiti.

Figure 10:
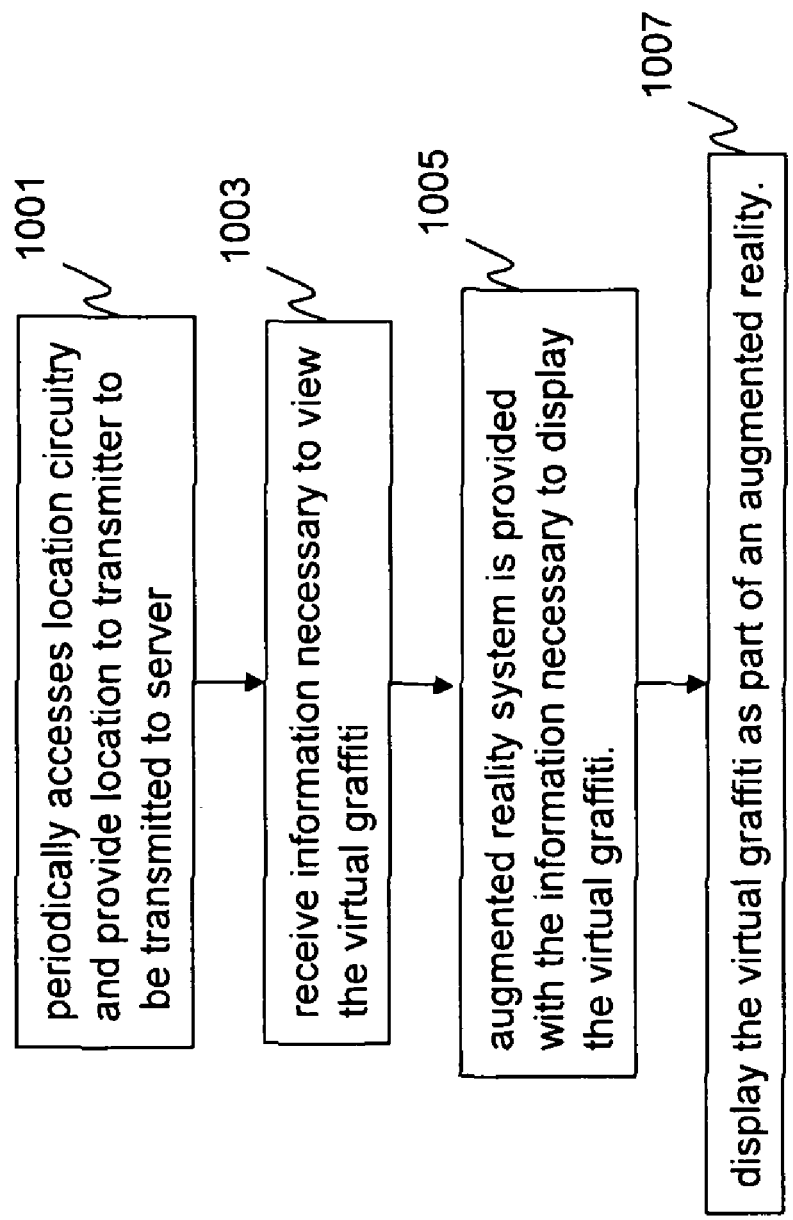
FIG. 10 is a flow chart showing operation of the user device of FIG. 1.

FIG. 10 is a flow chart showing operation of the user device of FIG. 1. In particular, the logic flow of FIG. 10 shows those steps necessary to display virtual graffiti. The logic flow begins at step 1001 where logic circuitry 405 periodically accesses location circuitry 409 and provides a location to transmitter 411 to be transmitted to server 101. At step 1003, receiver 413 receives information necessary to view the virtual graffiti. As discussed above, this information may simply contain a gross location of the virtual graffiti along with a representation of the virtual graffiti. In other embodiments, this information may contain the location of a border for the virtual graffiti along with the image to be displayed within the border. In yet another embodiment, the information may contain the necessary information to attach the virtual graffiti to an object. Such information may include a digital representation of the physical object, or a precise location of the virtual graffiti. At step 1005, logic circuitry 405 accesses augmented reality system 415 and provides system 415 with the information necessary to display the virtual graffiti. For the 3D case, this would include the device's orientation to specify a viewpoint. Finally, at step 1007, display 401 displays the virtual graffiti as part of an augmented reality scene.

While the invention has been particularly shown and described with reference to particular embodiments, it will be understood by those skilled in the art that various changes in form and details may be made therein without departing from the spirit and scope of the invention. For example, it is envisioned that a user who receives virtual graffiti may be able to modify the virtual graffiti and then store the modified virtual graffiti on server 101. Multiple users may store multiple versions of the modified virtual graffiti on server 101. Users are allowed to modify any version of the virtual graffiti, no matter whether it is the original version, any intermediate versions, or the latest version. Therefore, a hierarchical relationship among all versions of the virtual graffiti can be established, which can be represented as a tree, with each node representing one version of the virtual graffiti and all its children representing the versions that are directly extended from the current version. Each version of the virtual graffiti is given a unique version number, may contain different attributes (such as locations), and may be available to different lists of users. Users can view multiple versions of the virtual graffiti at the same time and have the freedom to choose any versions for further modification. Once the modification is performed by the user, a new version of the virtual graffiti is created and sent to the server along with its location and a list of users having the privilege to view the virtual graffiti. The new version is then stored on the server and is available to other users of the system.

With the above in mind, a first user can create virtual graffiti to be stored on server 101. Server 101 may, at a later time receive the virtual graffiti from a second device along with a location of the modified virtual graffiti, wherein the modified virtual graffiti is an updated version of the virtual graffiti. Similarly, a first user may receive virtual graffiti as described above and then modify the virtual graffiti, sending the modified virtual graffiti back to server 101.

The invention claimed is:

1. A method for a device to create virtual graffiti, the method comprising the steps of:
   the device being placing near a first point;
   the device determining a location of the first point; the device using the location of the first point to define a user created polygonal boundary for the virtual graffiti;
   the first point is used to connect with at least four additional points for shaping the polygonal boundary beyond a rectangular shape and into a curved 3-dimensional shape for containing the virtual graffiti;
   the device receiving an image to be used as the virtual graffiti; and
   the device providing the image and information on the boundary to a server, wherein the server provides the virtual graffiti to a user when that user is near a location of the virtual graffiti.

2. The method of claim 1 further comprising the step of:
   the device creating the virtual graffiti by fitting the image within the boundary for the virtual graffiti.

3. The method of claim 2 further comprising the steps of:
   the device determining a location of the virtual graffiti;
   the device receiving a list of devices that may view the virtual graffiti;
   the device providing the virtual graffiti, the location of the virtual graffiti, and the list to a server, wherein the server provides the virtual graffiti to a user on the list when that user is near the location.

4. The method of claim 1 further comprising the steps of:
   the device determining a location of the virtual graffiti;
   the device receiving a list of devices that may view the virtual graffiti;
   the device additionally providing the location and the list to a server, wherein the server provides the virtual graffiti to a user on the list when that user is near the location.

5. The method of claim 1 wherein the step of providing the image and the information on the boundary to a server comprises the step of wirelessly transmitting the image and the information on the boundary to a server.

6. A method for a device to create virtual graffiti, the method comprising the steps of:
   the device being placing near a first point;
   the device determining a location of the first point; the device being placed near a second point; the device determining a location of the second point;
   the device determining a user created polygonal boundary for the virtual graffiti by using at least the location of the first point and the location of the second point as vertices for the boundary for the virtual graffiti;
   the first point and second points are connected to at least three additional points for shaping the polygonal boundary beyond a rectangular shape and into a curved 3-dimensional shape for containing the virtual graffiti;
   the device receiving an image to be used as virtual graffiti; and the device creating the virtual graffiti by fitting the image within the polygonal boundary of the virtual graffiti.

7. The method of claim 6 further comprising the steps of:
   the device determining a location of the virtual graffiti;
   the device receiving a list of devices that may view the virtual graffiti;
   the device providing the virtual graffiti, the location, and the list of devices that may view the virtual graffiti to a server, wherein the server provides the virtual graffiti to a user on the list when that user is near the location.

8. The method of claim 7 wherein the step of providing comprises the step of wirelessly transmitting.

9. An apparatus comprising:
   location circuitry;
   logic circuitry accessing the location circuitry to determine a location of at least five points used to define a user created polygonal boundary, beyond a rectangle shape, and into a curved 3-dimensional shape for containing the virtual graffiti, the logic circuitry then receiving an image to be used as virtual graffiti; and
   a transmitter providing the image and information on the polygonal boundary to a server, wherein the server provides the virtual graffiti to a user when that user is near a location of the virtual graffiti.

10. The apparatus of claim 9 further comprising:
    a database; and
    wherein the logic circuitry obtains the image from the database and creates the virtual graffiti by fitting the image within the boundary for the virtual graffiti.

11. The apparatus of claim 9 wherein the logic circuitry determines a location of the virtual graffiti and receives a list of devices that may view the virtual graffiti, and wherein the transmitter provides the location and the list to a server, wherein the server provides the virtual graffiti to a user on the list when that user is near the location.

* * * * *